United States Patent [19]

Suzuki

[11] Patent Number: 5,012,138

[45] Date of Patent: Apr. 30, 1991

[54] INTERFACE CIRCUIT FOR ASYNCHRONOUS DATA TRANSFER

[75] Inventor: Takashi Suzuki, Hamamatsu, Japan

[73] Assignee: Yamaha Corporation, Hamamatsu, Japan

[21] Appl. No.: 384,637

[22] Filed: Jul. 25, 1989

[30] Foreign Application Priority Data

Jul. 26, 1988 [JP] Japan .................................. 63-186468

[51] Int. Cl.⁵ ................. H03K 19/0175; H03K 19/00; H03K 3/01
[52] U.S. Cl. ..................................... 307/475; 307/480; 307/269; 328/63; 328/72; 377/78
[58] Field of Search ....................... 307/269, 480, 475; 328/55, 63, 72; 377/55, 66, 76, 77, 78; 365/221, 78

[56] References Cited

U.S. PATENT DOCUMENTS

| | | | |
|---|---|---|---|
| 3,893,033 | 7/1975 | Finch | 328/72 |
| 4,341,950 | 7/1982 | Kyles et al. | 377/78 |
| 4,525,849 | 6/1985 | Wolf | 328/55 |
| 4,649,512 | 3/1987 | Nukiyama | 377/66 |

OTHER PUBLICATIONS

Adams, "Sequential Buffer Control", IBM Tech Disclosure Bulletin, vol. 14, No. 7, Dec. 1971, pp. 2069-2070.

Primary Examiner—Timothy P. Callahan
Attorney, Agent, or Firm—Burns, Doane, Swecker & Mathis

[57] ABSTRACT

An interface circuit connected between first and second units includes first and second registers, wherein these first and second units are asynchronous with each other. Data from the first unit is written into the first register by a write pulse from the first unit, while the output of first register is to be read by the second register by a read-in pulse from the second unit. This write pulse is asynchronous with the read-in pulse. When a phase difference between phases of the write pulse and read-in pulse is within the predetermined phase range, the phase of read-in pulse is varied by the predetermined phase value, e.g., 180 degrees. Then the second register reads in the output of first register by this read-in pulse whose phase is varied. Thereafter, the output of second register is fed to the second unit, so that the data transfer is performed between the first and second units without data dropout.

5 Claims, 5 Drawing Sheets

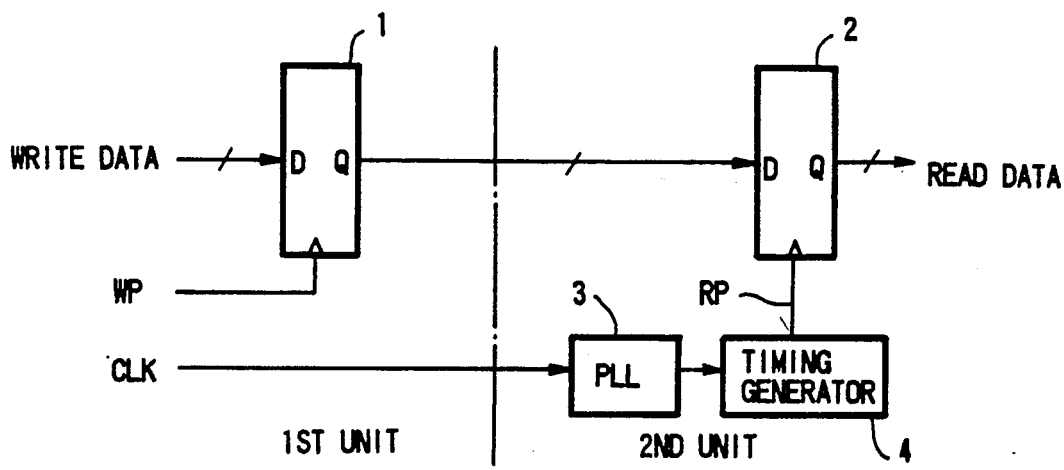
FIG.1 *(PRIOR ART)*
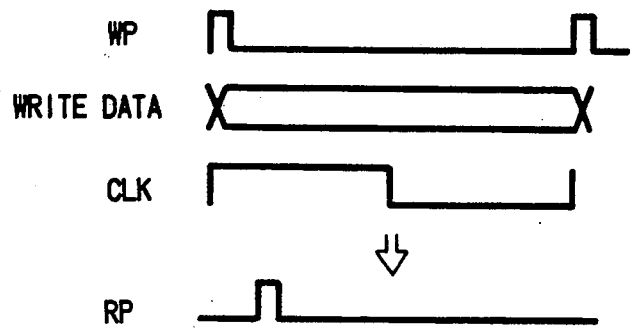
FIG.2 *(PRIOR ART)*
FIG.3 *(PRIOR ART)*
FIG.4 *(PRIOR ART)*

INTERFACE CIRCUIT FOR ASYNCHRONOUS DATA TRANSFER

BACKGROUND OF THE INVENTION

1. Field of the Invention

The present invention relates to an interface circuit, and more particularly to an interface circuit for performing a data transfer between first and second units which are asynchronous with each other., i.e., whose data rates are different or whose data rates are the same but phases are different.

2. Prior Art

In the field of the digital audio technique or data communication technique, it is sometimes necessary to perform the data transfer between the first and second units which are asynchronous with each other. In such asynchronous state, if the data transfer is performed regardless of the synchronization between the first and second units, data reading error must be occurred. Particularly, in some cases, the first clock pulse frequency of the first unit is extremely close to the second clock pulse frequency of the second unit, and the frequency difference between the first and second clock pulse frequencies is due to the frequency difference between the crystal vibrators thereof. In such cases, once the timing of write pulse for writing the data into the output register in the first unit becomes close to that of read pulse by which the second unit reads the data from the output register, there must be a possibility in that the data reading errors are continuously occured during several to several tens of periods. However, in the case where there is a sufficiently large phase difference between the write pulse of the first unit and the read pulse of the second unit, such errors can be avoided.

Conventional, in order to avoid the above data reading error, the following interface circuits are employed.

(1) Interface Circuit Using Phase-Locked Loop (PLL)

In FIG. 1, 1 designates a first register into which the output of first unit is to be written: and WP designates a write pulse by which the data is written into the first register 1. In addition, 2 designates a second register of the second unit into which the output of first register 1 is to be written. The output of this second register 2 is fed to the second unit. Further, 3 designates a PLL which generates a clock pulse in synchronism with a clock pulse CLK, and this generated clock pulse is fed to a timing generator 4. Based on this clock pulse from the PLL 3, the timing generator 4 generates a read pulse RP, which is then fed to the second register 4. FIG. 2 shows timing charts of this circuit as shown in FIG. 1.

This interface circuit can synchronize the read pulse RP with the write pulse. Therefore, the errors can be avoided. However, this interface circuit is disadvantageous in that its configuration for the clock system in the second unit must be complicated.

(2) Interface Circuit Using First-In/First-Out (FIFO) Register

This interface circuit uses the FIFO register as shown in FIG. 3. When the read/write ratio of this FIFO register is nearly at "1", there is no problem. However, when the write period is always shorter than the read period so that the write cycle is always faster than the read cycle, there must be a problem in which the data to be written overflows the capacity of the FIFO register.

(3) Interface Circuit Using Sampling Frequency Converter

This interface circuit uses the sampling frequency converter as shown in FIG. 4. Since the over-sampling process, low-pass filtering process, decimation process and the like are executed within this interface circuit, the error can be avoided. However, similar to the foregoing interface circuit using the PLL, it is disadvantageous in that the configuration of this interface circuit must be complicated.

As described heretofore, the conventional interface circuits are disadvantageous in that the configuration must be complicated and the production cost must be raised.

SUMMARY OF THE INVENTION

Accordingly, it is a primary object of the present invention to provide an interface circuit having a quite simple configuration and which can avoid the data reading errors to be continuously occurred.

In a first aspect of the present invention, there is provided an interface circuit comprising:

(a) a first register for reading in input data by a first pulse signal;

(b) a second register for reading in an output of the first register by a second pulse signal which is asynchronous with the first pulse signal;

(c) phase difference detecting means for detecting whether or not a phase difference between phases of the first pulse signal and the second pulse signal is within a predetermined range; and (d) phase changing means for changing the phase of the second pulse signal when the phase difference detecting means detects that the phase difference is within the predetermined range.

In a second aspect of the present invention, there is provided an interface circuit for performing a data transfer between a first unit and a second unit which are asynchronous with each other comprising:

(a) a first register for reading in input data from the first unit by a write pulse;

(b) a second register for reading in an output of the first register by a read-in pulse from the second unit, wherein the read-in pulse is asynchronous with the write pulse;

(c) phase coincidence detecting means for detecting whether or not a phase difference between phases of the write pulse and the read-in pulse is within a predetermined phase range;

(d) a phase changing means for changing the phase of the read-in pulse by a predetermined phase value when the phase coincidence detecting means detects that the phase difference is within the predetermined phase range; and (e) a third register for reading in an output of the second register by a timing which is different from a timing of the read-in pulse.

BRIEF DESCRIPTION OF THE DRAWINGS

Further objects and advantages of the present invention will be apparent from the following description, reference being had to the accompanying drawings wherein a preferred embodiment of the present invention is clearly shown.

In the drawings:

FIGS. 1 to 4 are drawings for explaining the conventional interface circuits;

DESCRIPTION OF A PREFERRED EMBODIMENT

[A] CONFIGURATION OF AN EMBODIMENT

Figure 5:
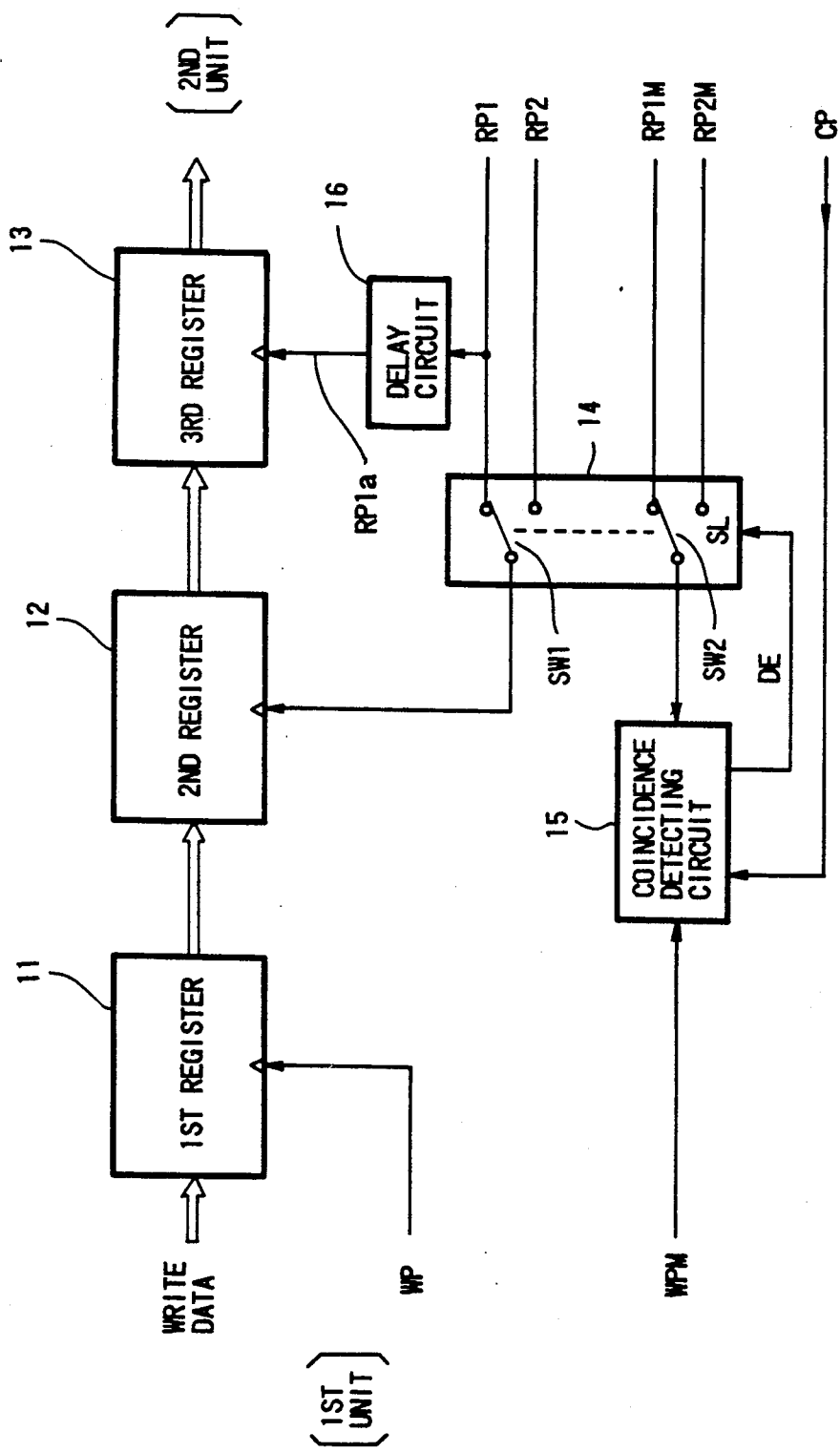
FIG. 5 is a block diagram showing the configuration of the interface circuit according to an embodiment of the present invention.
Figure 6:
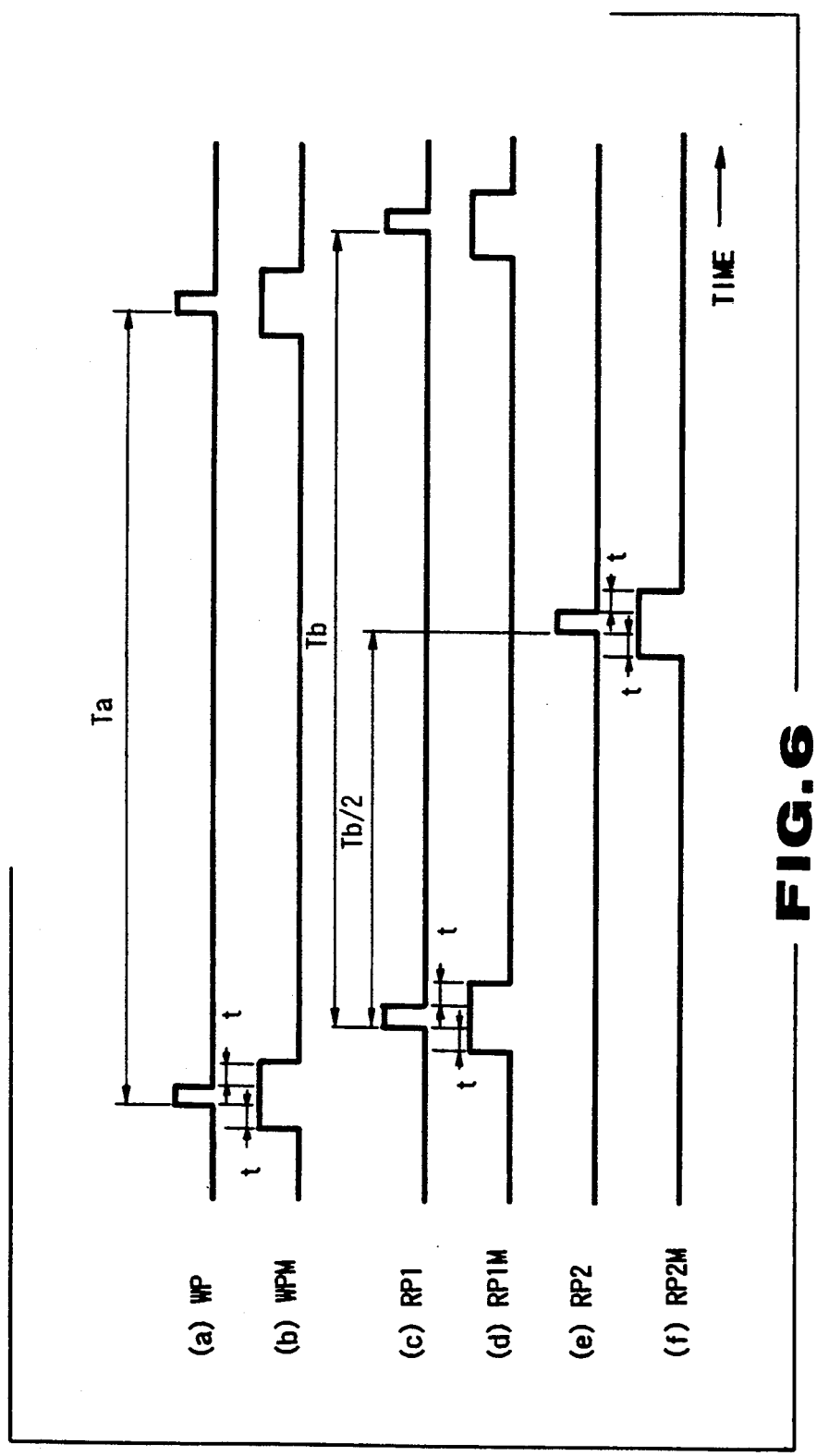
FIGS. 6, 8 and 9 are timing charts for explaining the operations of an embodiment.

FIG. 5 is a block diagram showing the interface circuit according to an embodiment of the present invention. In FIG. 5, 11 designates a first register into which the output of the first unit (not shown) is to be written; WP designates a write pulse outputted from the first unit; and WPM designates a write pulse mask signal outputted from the first unit. This signal WPM is generated in sychronism with the write pulse WP. In the present embodiment, the leading edge of the write pulse mask signal WPM as shown in FIG. 6(b) is ahead by a predetermined time t from the leading edge of the write pulse WP as shown in FIG. 6(a). Then, the trailing edge of this signal WPM is behind by the predetermined time t from the trailing edge of the write pulse WP. This write pulse mask signal WPM is fed to a coincidence detecting circuit 15.

Meanwhile, 12 designates a second register into which the output of first register 11 is written, and 13, designates a third register which reads and then transmits the output of second register 12 to the second unit (not shown). In addition, 14 designates a selector consisting of two switches SW1 and SW2 which operate in an interactive manner. In response to the signal fed to a terminal SL of the selector 14, the switches SWL and SW2 are changed over. Further, RP1 and RP2 are read-in pulses having the same period, which are both outputted from the second unit. In the present embodiment, the phase of RP1 is different from that of RP2 by about 180 degrees. One of these pulses RP1 or RP2 is selected by the switch SW1 and then fed to a clock terminal of the second register 12. These pulses RP1 and RP2 are asynchronous with the write pulse WP. 16 designates a delay circuit which delays the pulse RP1 by the delay time which is slightly shorter (e.g., 95%) than the period of RP1. This delay circuit 16 outputs a read-in pulse RP1a to a clock terminal of the third register 13, wherein RP1a is behind RP1. Under control of this read-in pulse RP1a, the data in the second register 12 is read and then written into the third register 13. Incidentally and RP1M, RP2M are both read pulse mask signals. The leading edge of the signal RP1M as shown in FIG. 6(d) is ahead of RP1 as shown in FIG. 6(c) by the time t while the trailing edge thereof is behind RP1 by the time t. Similarly, the leading edge of the signal RP2M as shown in FIG. 6(f) is ahead of RP2 as shown in FIG. 6(e) by the time t, while the trailing edge thereof is behind by the time t.

The coincidence detecting circuit 15 always checks the write pulse mask signal WPM and one of the read pulse mask signals RP1M or RP2M which is selectively fed thereto via the switch SW2. When both of these two signals are at "1", the coincidence detecting circuit 15 inverts its output signal, i.e., a detection signal DE.

Figure 7:
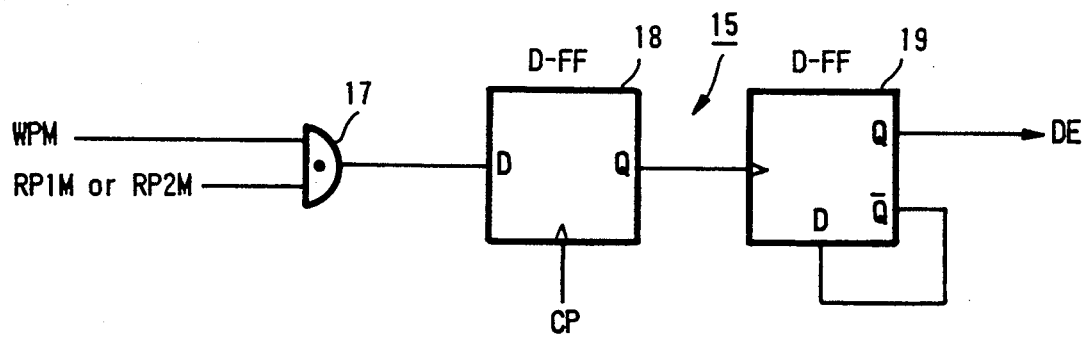
FIG. 7 is a block diagram showing a detailed configuration of the coincidence detecting circuit shown in FIG. 5.

FIG. 7 is a block diagram showing the inner configuration of this coincidence detecting circuit 15. In FIG. 7, an AND gate 17 performs and AND operation between the write pulse mask signal WPM and the read pulse mask signal RPM1 or RPM2 whereby its output is then fed to a data input D of a delay flip-flop D-FF 19. Based on a clock pulse CP from the second unit, the D-FF 18 reads in the output of AND gate 17, which is then transmitted to a clock terminal of another D-FF 19. Herein, a period Tc of this clock pulse CP is set smaller than the foregoing predetermined time t (i.e., Tc<t). In the D-FF 19, a data input D is connected to an output terminal $\overline{Q}$, so that the D-FF 19 works as the trigger flip-flop. Then, the output of this D-FF 19 is fed to the terminal SL of selector 14 as the detection signal DE.

[B] OPERATION OF AN EMBODIMENT

Next, description will be given with respect to the operation of the present interface circuit according to the present embodiment. Herein, the period of the write pulse WP is set extremely close to that of read-in pulse RP1 and RP2. At the start timing, both of the D-FF 18, 19 within the coincidence detecting circuit 15 are reset. As a result, the detection signal DE must be the "0" signal whose value is at "0". Due to such "0" signal, the connections of the switches SW1 and SW2 in the selector 14 becomes those shown in FIG. 5. Thus, the read-in pulse RP1 is fed to the second register 12, while the read pulse mask signal RP1M is fed to the coincidence detecting circuit 15. Thereafter, when the output of first unit is written into the first register 11 by the write pulse WP, it is read by the second register by the read-in pulse RP1, and then it is read by the third register 13 by the delayed read-in pulse RP1a. Afterwards, this data is outputted to the second unit.

The above-mentioned read-and-write operations are repeated. However, since the period of the write pulse WP is not equal to that of the read-in pulse RP1, the moment of generating the write pulse WP gradually becomes closer to the moment of generating the read-in pluse RP1. When the difference between these two moments becomes less than the time 2t, there must occur a period wherein both of the write pulse mask signal WPM and the read pulse mask signal RP1M are at "1". At this time, the output of AND gate 17 is at "1". In this state, when the output of D-FF 18 rises to "1", the D-FF 19 is invented. As a result, the "0" signal (i.e., detection signal DE) is inverted to the "1" signal whose value is at "1", which changes over the switches SW1 and SW2 within the selector 14. Thus, the read-in pulse RP2 is fed to the second register 12, while the read pulse mask signal RP2M is fed to the coincidence detecting circuit 15.

As described before, the phase of RP1 is different from that of RP2 by 180 degrees. So and when the switches SW1, SW2 are changed over, the generation timings of WP and RP2 must be largely shifted. Therefore, the output of AND gate 17 is at "0", so that the output of D-FF 18 "0" by the next clock pulse CP. Thereafter, the read-in pulse RP2 starts the reading operation of the second register 12. Then, when the difference between the generation timings of WP and RP2 becomes less than the time 2t, the output of AND gate 17 is "1" again. When this "1" signal is read by the D-FF 18 and the output of D-FF 19 is inverted. Thus, the switches SW1, SW2 are changed over. Thereafter, RP1 is fed to the second register 12, while RP1M is fed to the coincidence detection circuit 15. Afterwards, the above-mentioned operations are repeated.

Figure 8:
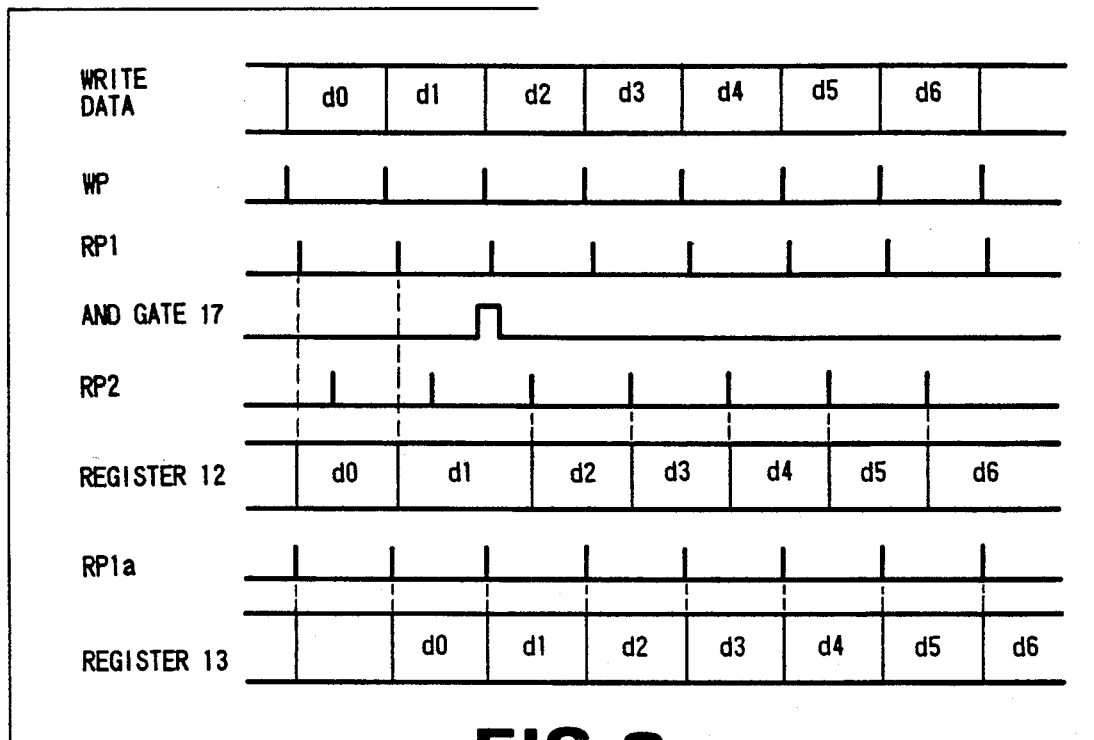
Figure 9:
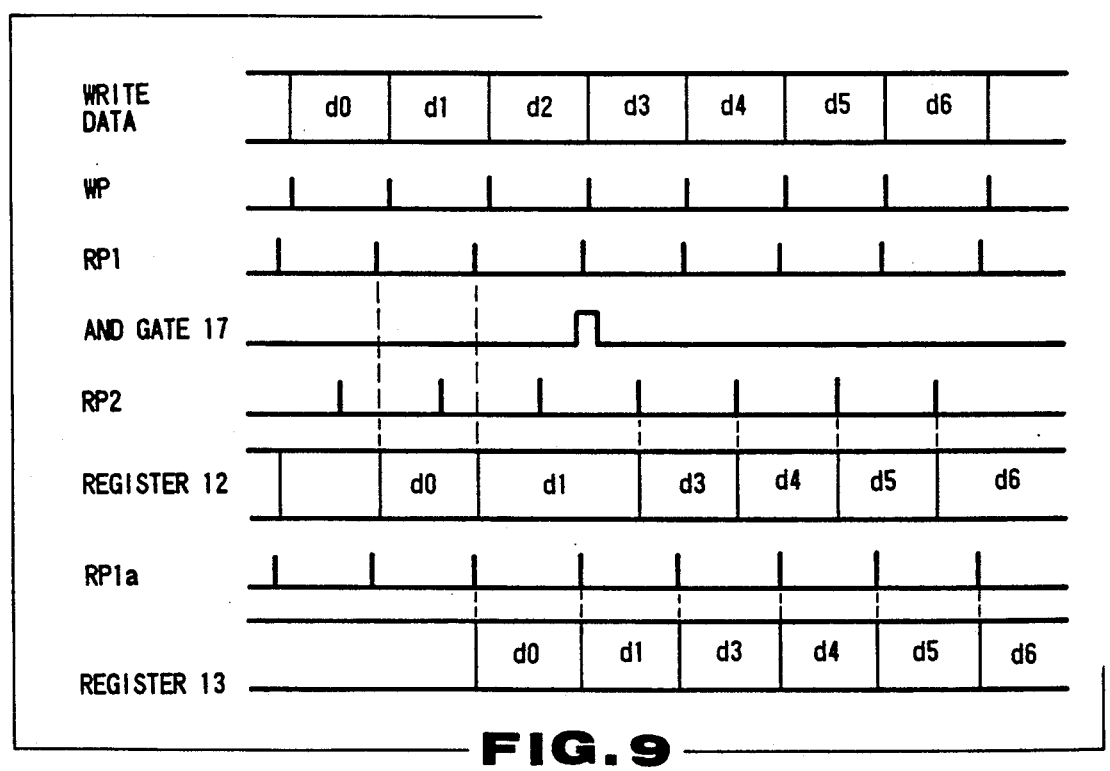

FIGS. 8 and 9 are timing charts showing the operations of the present embodiment. In the timing charts of FIG. 8, the read-in pulse RP1 is generated at the time which is slightly delayed from the write pulse WP, and the read-in operation of the second register 12 is performed based on this read-in pulse RP1. Then, the generation timing of the read-in pulse RP1 becomes closer to that of the write pulse WP. After the output of AND gate 17 rises to "1", the read-in operation of the second register 12 is performed based on another read-in pulse RP2. Due to such change-over of the read-in pulse from RP1 to RP2, the period of the output of register 12 becomes irregular (see, data d1). However, this irregularity can be corrected since the output of second register 12 is read by the third register 13 again.

On the other hand, in the timing charts of FIG. 9, the read-in pulse RP1 is generated prior to the write pulse WP, and the read-in operation of the register 12 is performed based on this read-in pulse RP1. Then, the generation timing of this read-in pulse RP1 becomes even closer to that of the write pulse WP. In this case as shown in FIG. 9, data d2 is dropped out. However, if the data, d1, d2, . . . are the data for the digital, audio, such dropout of one data d2 does not cause any large noise. In short, such data dropout does not make any trouble.

In the interface circuit according to the present embodiment, once the read-in pulse is changed over, the phase difference between the read-in pulse and write pulse WP is set to 180 degrees. Therefore, the read-in pulse will not be changed over again for a while. Thus, the above-mentioned data dropout will not occurr continuously.

Figure 10:
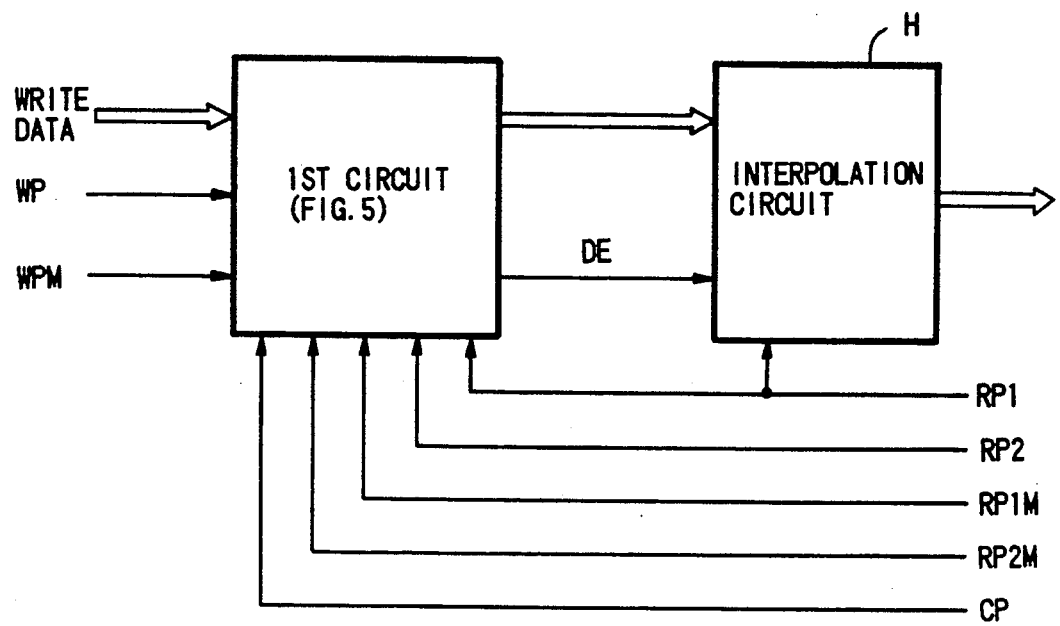
FIGS. 10 and 11 are block diagrams showing modified examples of an embodiment of the present invention.

[C] MODIFIED EXAMPLES OF AN EMBODIMENT (1) It is possible to further provide an interpolation circuit H as shown in FIG. 10 after the first circuit shown by FIG. 5. This interpolation circuit interpolates the dropout of data d2. In this example, and the data d1, d3 are detected by the variation in the detection signal DE. Then, the data d2 is newly made by the linear interpolation. This new data d2 is then inserted between the data d1, and d3 so that the linear interpolation is completed.

Figure 11:
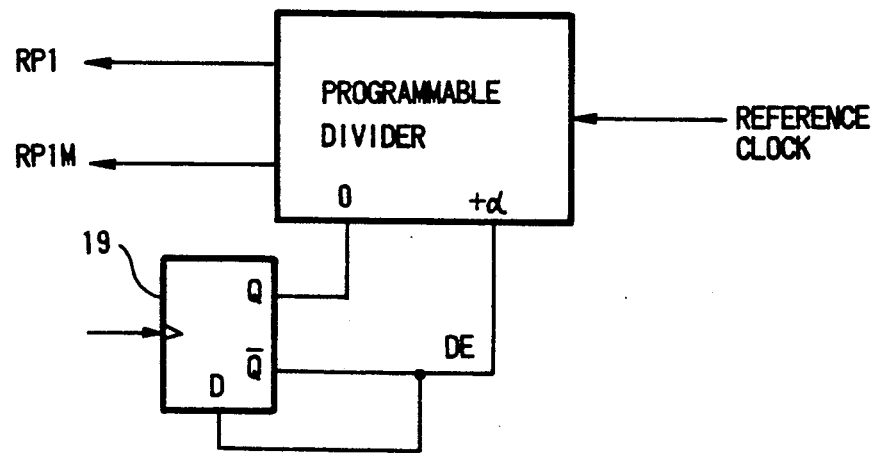

(2) In the present embodiment, when the generation timing of one read-in pulse (e.g., RP1) becomes closer to that of the write pulse WP. this read-in pulse is replaced by another read-in pulse (e.g., RP2) whose phase is different from that of one read-in pulse by 180 degrees. Thus, it is possible to shift the phase of one read-in pulse by 180 degrees. Herein, this phase difference is not limited to 180 degrees in the present invention. In this example, a programmable divider as shown in FIG. 11 can be connected to the D-FF 19. Based on the reference clock, this programmable divider outputs the read-in pulse RP1 and read pulse mask signal RP1M, which are directly fed to the register 12 and coincidence detecting circuit 15 respectively. When the generation timing of read-in pulse RP1 becomes closer to that of the write pulse WP, the programmable divider automatically shifts the phase of RP1 (& RP1M) by 180 degrees.

(3) In the present embodiment and two read-in pulses RP1, RP2 having different phases are used. However, it is possible to provide three or more read-in pulses having three or more different phases, each of which is changed over in turn. In addition, as similar to the above-mentioned example (2), it is also possible to shift the phase of read-in pulse by three or more stages.

This invention may be practiced or embodied in still other ways without departing from the spirit or essential character thereof as described heretofore. Therefore, the preferred embodiment described herein is illustrative and not restrictive, the scope of the invention being indicated by the appended claims and all variations which come within the meaning of the claims are intended to be embraced therein.

What is claimed is:

1. An interface circuit comprising:
   (a) a first register for reading in input data by a first pulse signal;
   (b) a second register for reading in an output of said first register by a second pulse signal which is asynchronous with said first pulse signal, wherein said second pulse signal can be arbitrarily generated at any predetermined generation timing;
   (c) phase difference detecting means for detecting whether or not a phase difference between phases of said first and second pulse signals is within a predetermined range; and
   (d) selecting means for selecting a predetermined generation timing for said second pulse signal when said phase difference detecting means detects that said phase difference is within the predetermined range.

2. An interface circuit according to claim 1 wherein said selecting means changes the phase of said second pulse signal to a phase which is different from the phase of said first pulse signal by 180 degrees.

3. An interface circuit for performing a data transfer betwreen a first unit and a second unit which are asynchronous with each other comprising:
   (a) a first register for reading in input data from said first unit by a write pulse;
   (b) a second register for reading in an output of said first register by a read-in pulse from said second unit, wherein said read-in pulse is asynchronous with said write pulse;
   (c) phase coincidence detecting means for detecting whether or not a phase difference between phases of said write pulse and said read-in pulse is within a predetermined phase range;
   (d) phase changing means for changing the phase of said read-in pulse by a predetermined phase value when said phase coincidence detecting means detects that said phase difference is within the predetermined phase range; and
   (e) a third register for reading in an output of said second register by a timing which is different from a timing of said read-in pulse.

4. An interface circuit according to claim 3 wherein said predetermined phase value is equal to 180 degrees.

5. An interface circuit according to claim 3 wherein said read-in pulse includes a first read-in pulse and a second read-in pulse whose phases are different from each other by 180 degrees, one of said first read-in pulse and said second read-in pulse being selectively fed to said second register, said phase changing means changing over said first read-in pulse to said second read-in pulse when said phase coincidence detecting means detects that said phase difference is within the predetermined phase range.

* * * * *